May 23, 1950  N. WAKEFIELD  2,509,116
COMPASS COMPENSATOR

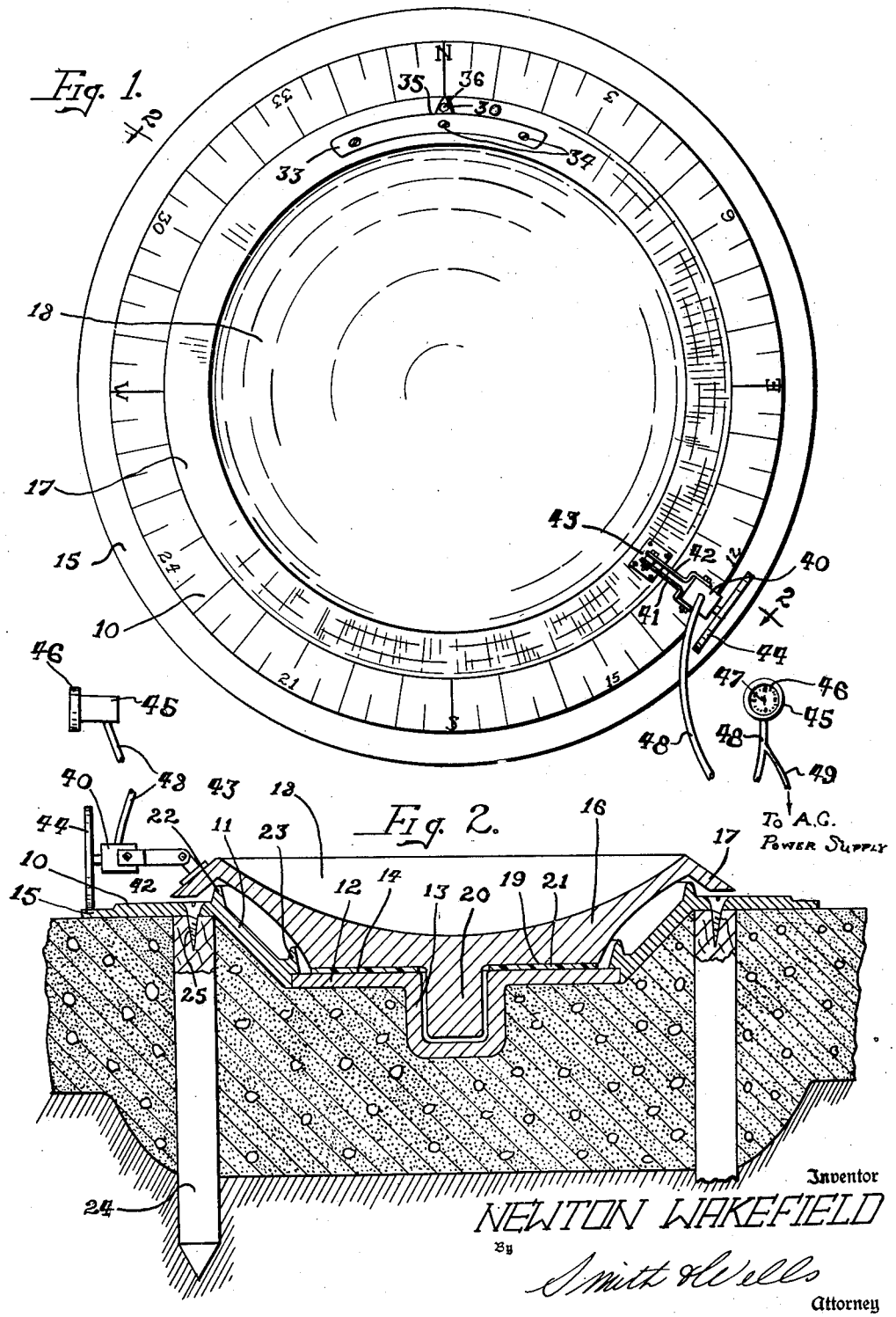

Filed July 21, 1947  3 Sheets-Sheet 2

Inventor
NEWTON WAKEFIELD
By Smith & Wells
Attorney

May 23, 1950      N. WAKEFIELD      2,509,116
COMPASS COMPENSATOR
Filed July 21, 1947      3 Sheets-Sheet 3
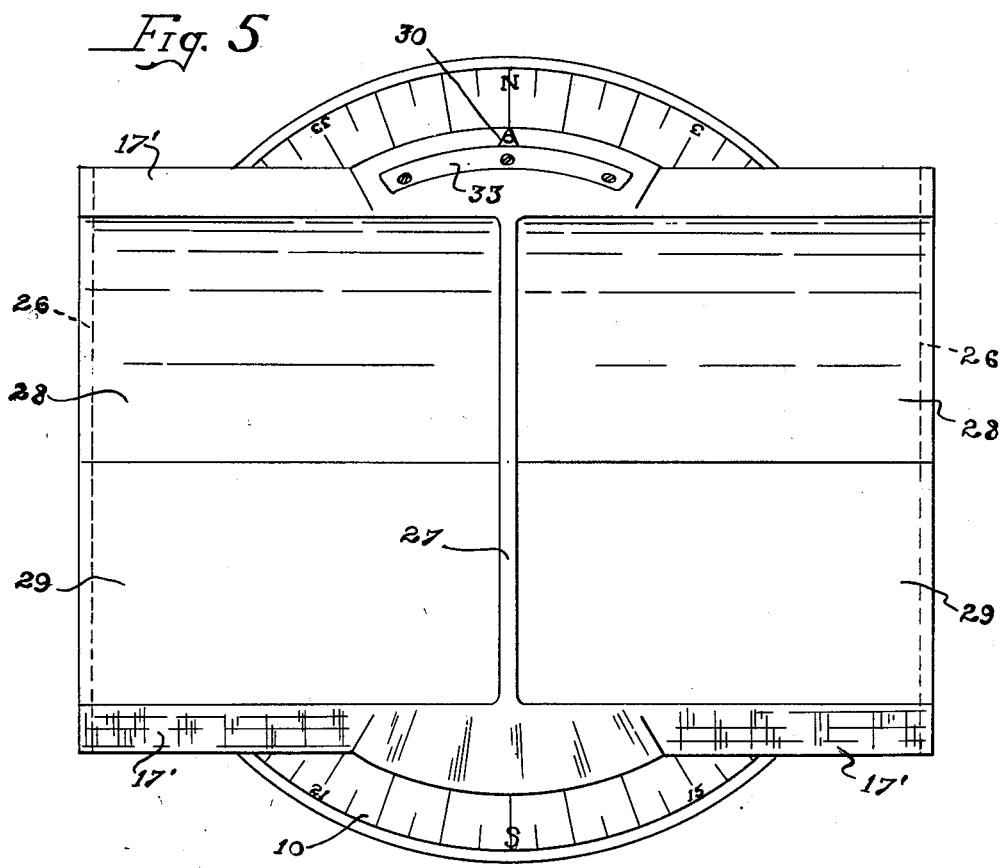
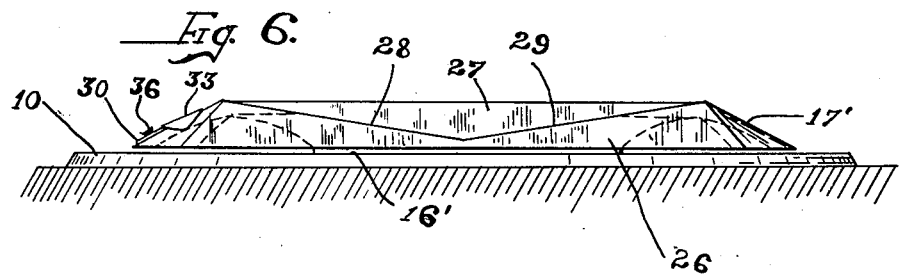
Inventor
NEWTON WAKEFIELD
By Smith & Wells
Attorney Patented May 23, 1950

2,509,116

UNITED STATES PATENT OFFICE 2,509,116

COMPASS COMPENSATOR

Newton Wakefield, Coeur d'Alene, Idaho

Application July 21, 1947, Serial No. 762,254

6 Claims. (Cl. 73—1)

My invention relates to improvements in a compass compensator.

This application is a continuation-in-part of my copending application, Serial No. 696,195, filed September 11, 1946, now abandoned.

It is the principal purpose of my invention to provide a fast, accurate, and simple means to "swing" an aircraft compass in order to check and compensate for deviation. Essentially my invention contemplates the provision of a wheel mounting member having means to receive and substantially center one of the supporting wheel units of the aircraft when the wheel, or pair of wheels, in the case of dual wheel supports, is rolled up on the member. This member in the form of a bowl or trough is rotatably mounted on a base plate which is surrounded by a 360 degree compass rose dial.

One specific purpose of my invention is to provide a novel mounting for the wheel supporting trough whereby it is essentially free of danger of becoming stuck or injured by freezing of ice around it, by dust or other weather conditions. Another feature in the novel mounting is the provision of a relatively inexpensive non-magnetic bearing wherein the trough can take the shock of having the wheel of an airplane rolled up onto it without injury to the bearing and subsequent difficulty in turning.

The practice of placing an airplane in proper position on a compass rose and then aligning the plane with the radial lines of the compass rose is a well-known one. However, the various devices employed for turntables and for handling the airplane apparently have been too complicated or difficult to use, with the result that most fields have no equipment of this character. According to my invention, I provide a novel construction of turntable and compass rose dial whereby the airplane can be taxied into position with one wheel on the turntable and then turned, using the airplane power or other power, to make the necessary checks for compensating for errors in the compass reading. The device does not require any liquid or electric supply or other auxiliary equipment and is so designed as to be operative under all weather conditions.

With my improved compass compensator a pilot can check his compass alone in a very short time. This makes it possible for a single installation at a landing field to take care of the needs of all planes. All that is necessary is to locate the compensator at a convenient place free from any magnetic disturbances where the pilots may have ready access to it. It is a known fact that compass errors are often responsible for aircraft getting off course and many serious accidents have resulted from this cause.

The novel features that I consider characteristic of my invention are set forth with particularity in the claims. The invention itself, however, both as to its organization and its method of operation, together with additional objects and advantages thereof, will be best understood from the following description of a specific embodiment when read in connection with the accompanying drawings in which:

Figure 1 is a plan view of my improved compass compensator;

Figure 2 is a sectional view taken on the line 2—2 of Figure 1;

Figure 5 is a plan view of a slightly modified form of compass compensator for handling aircraft with dual wheel landing gear; and Figure 6 is an end view of the construction shown in Figure 5.

Figure 3:
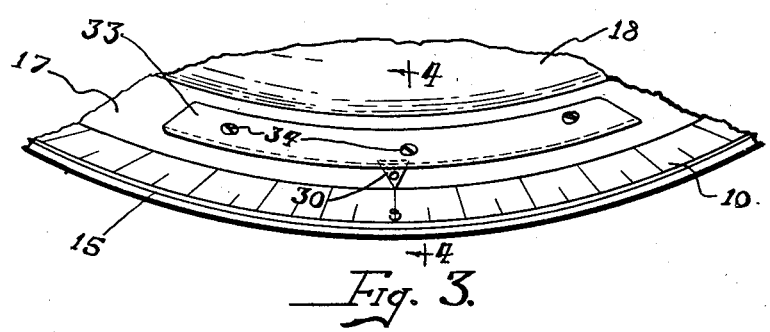
Figure 3 is a fragmentary perspective view of a portion of the turntable and compass rose dial.

Referring now in detail to the drawings and particularly to Figures 1 to 4 my invention is embodied in a construction wherein a compass rose dial and bearing housing is composed of a substantially flat dial portion 10 which is joined at its inner edge by a conical depressed portion 11. At its lower inner edge the conical portion 11 has a bearing plate portion 12 fixed thereto. The portion 12 has a central socket 13 formed therein and the surface of the bearing portion 12 around the socket, indicated at 14 is precision machined to provide a bearing surface. The dial portion 10 in the preferred form of the invention has a thinner outwardly extending rim 15 for a purpose which will presently appear.

The turntable itself comprises a casting 16, the rim 17 of which has a tapered upwardly and inwardly extending surface upon which the wheel of an airplane may ride in moving into the central trough 18 of the turntable. As shown the turntable extends down inside the conical portion 11 of the bearing support and has a flat lower surface 19 facing the bearing surface 14. This surface 19 is also machined and polished to provide a bearing surface. A central pin 20 is formed on the bottom of the turntable to fit in the socket 13 so as to center the turntable in the bearing plate 12. Preferably the pin 20 does not touch the bottom of the socket 13. The clearance around the pin within the socket is exaggerated in the drawings since a close fit is desired at this point to insure centering of the turntable. The cylindrical surfaces of the pin and the socket are machined smooth for bearing purposes. A special bearing sheet or disc 21 is interposed between the surfaces 14 and 19 to form the load carrying bearing for the turntable. The assembly is such that the space between the dial 10 and the rim 17 is very slight being in the neighborhood of one-sixteenth of an inch. This space is of course exaggerated in the drawings.

I have discovered that unusually fine results can be obtained with a new bearing sheet 21. For this purpose I utilize a resin sheet which is made of a polytetrafluoroethylene polymer. This resin is made by polymerizing gaseous tetrafluoroethylene to yield a solid granular polymer which can be moulded or extruded. This material forms a remarkably low friction bearing sheet which has a sufficient range of temperature wherein these bearing properties remain essentially constant that it is ideally suited for my purpose. The compressive strength of the material is as high as 1700 pounds per square inch. The material is substantially inert insofar as attached by any material that would be apt to contact it in a bearing such as is provided by the construction hereinbefore described. Other bearing materials may of course be used, but particularly good and unexpected results have been obtained with a bearing constructed as just described. It is essential that the bearing sheet be capable of withstanding great impact shocks and that it be capable of operation with no attention as to lubrication for long periods of time.

The conical portion 11 of the dial and bearing support has upstanding ribs 22 and 23 at its upper and lower edges. These ribs function essentially as barriers to prevent foreign matter of any character from reaching the bearing surfaces such as 14 and 19. It is contemplated, of course, that this device will be subjected to all sorts of weather conditions and that it must operate under extreme heat and cold conditions and the bearing must turn freely at all times if the device is to function properly. It should be installed at a site free from magnetic disturbances. As shown the dial and bearing support unit is preferably set in concrete with locking posts such as 24 provided in the concrete, the dial being secured to the posts by screws 25. The only maintenance required for the device is a periodic inspection and cleaning. To clean the device the turntable is lifted off. The only lubrication that I have found necessary or helpful is to add a quantity of kerosene at the time of cleaning. This kerosene may be added up to the level of the inner rib or ring 23. In installing the device it is preferable to support the rose dial and bearing support unit slightly above the surrounding ground level by means of the stakes 24. The concrete can then be poured around the unit and the slightly raised position will result in proper drainage.

Referring now to Figures 5 and 6 these figures illustrate a slightly different construction which is preferred for heavier aircraft which use dual wheel landing gear. In this case the turntable 16' is formed with a rectangular trough portion 26 which is provided with a central rib 27. The two wheels can then pass over the sloping portions 17' at the sides of the trough into the depressions formed by the sloping sides 28 and 29 of the troughs. The construction of the dial and bearing support unit 10 is the same in this form of the invention as it is in the main form. All the other auxiliary elements hereinafter to be described apply also to the form of trough-turntable construction.

Figure 4:
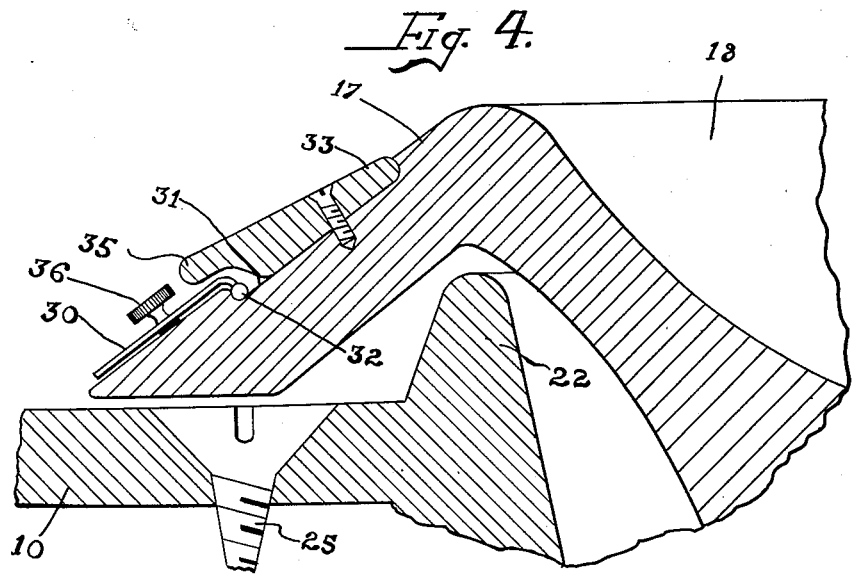
Figure 4 is a sectional view taken on the line 4—4 of Figure 3.

Referring now to Figures 3 and 4 these figures show on a large scale the novel means employed for mounting an indicator 30. To mount this indicator I form a depression 31 in a portion of the beveled surface 17 of the turntable. This depression provides a pocket to receive the guiding bearing 32 of the indicator. The depression is then covered by a cover plate 33 which is fastened down by screws 34. The cover plate has a lip 35 that extends over the upper portion of the indicator 30 to protect it. A small knob 36 is placed on the indicator for convenience in moving it around.

The manner of using the indicator when the compass of an aircraft is to be checked is to first bring the aircraft to the turntable with it headed approximately north. After one wheel of the aircraft is rolled onto the turntable the aircraft is then rotated until it is headed exactly toward magnetic north which is accomplished by aligning the plane with a reference line that may be painted or otherwise marked on the surrounding ground surface for a sufficient distance to enable the alignment to be accomplished easily. The indicator 30 is then moved along the depression 31 until it is set on magnetic north which is marked on the dial. After this is done the directions are determined by simply swinging the aircraft until the indicator 30 indicates the desired direction on the dial 10. The reading of the compass in the aircraft is then checked to determine what, if any, error exists and the aircraft is then moved to the next point of check.

My invention contemplates further the provision of means whereby the entire checking operation for compensating for errors in the reading of a compass in an aircraft may be made by the pilot while he is in the aircraft. In order to accomplish this result I provide the turntable with a system for remotely indicating the exact heading of the aircraft on the turntable. In order to accomplish this result I utilize a combination of two electric motors commonly known as "Selsyn" motors, which are so connected and energized by a proper source of alternating current that their rotors will always remain in exactly the same angular position with respect to their stators. This combination is a well-known one and has many industrial applications so the details thereof will not be described herein. One of the motors indicated at 40 is secured by brackets 41 and 42 and a mounting plate 43 to a portion of the turntable. This motor has a drive wheel 44 geared to it and the drive wheel is placed in direct contact with a portion of the dial and bearing support unit. The wheel is thus caused to turn whenever the turntable is rotated and it is so geared to the motor 40 that it will cause one complete rotation of the rotor element in the motor for each time the wheel completes a trip around the dial 10. The other motor 45 is a portable one and carries a dial 46 with a pointer 47 rotatable with the rotor of the motor 45. Suitable electrical connections indicated at 48 and 49 are provided for connecting the motors 40 and 45 to each other and to an alternating current power supply. The alternating current power supply may be that of the aircraft itself or any other suitable source.

The motor 49 may, of course, be mounted in any suitable way to the turntable. The only requirement is that its rotor make a complete revolution each time the turntable makes a revolution. The pointer 47 faithfully indicates the angular position of the turntable with respect to the dial. It is, therefore, a simple matter for the aircraft pilot to check his compass while he remains in the aircraft and the aircraft is turned about the axis of the turntable.

It is believed that the nature and advantages of my invention will be clear from the foregoing description and the accompanying drawings. Having thus described my invention, I claim:

1. A compass compensating device of the character described comprising in combination a dial plate and bearing support having a circular substantially flat rim portion, a conical depressed portion within said rim portion and a central relatively large bearing plate portion all joined together, a turntable having a rim portion fitting over said dial plate and said rim portion having an upwardly and inwardly sloping top surface, said turntable having its center depressed to provide a wheel receiving trough and having a relatively large bottom surface opposed to said bearing plate portion, cooperating pivot and bearing means on the turntable and bearing plate portions for centering the turntable on the bearing plate portion and a non-magnetic anti-friction disk interposed between the bearing plate portion and the bottom of said turntable supporting the turntable for rotation.

2. A compass compensating device of the character described comprising in combination a dial plate and bearing support having a circular substantially flat rim portion, a conical depressed portion within said rim portion and a central bearing plate portion all joined together, a turntable having a rim portion fitting over said dial portion and having an upwardly and inwardly sloping top surface, said surface having a depression in a portion thereof, a pointer seated in said depression, a cover plate for said depression having a lip extending over a portion of the pointer and securing the pointer in said depression, said turntable having its center depressed to provide a wheel receiving pocket, cooperating socket and pin means on the turntable and bearing plate portion for centering the turntable on the bearing plate portion and a bearing disk interposed between the bearing plate portion and the turntable supporting the turntable for rotation.

3. A compass compensating device of the character described comprising in combination a dial plate and bearing support having a circular substantially flat rim portion, a conical depressed portion within said rim portion and a central relatively large bearing plate portion all joined together, a turntable having a rim portion fitting over said dial plate and said rim portion having an upwardly and inwardly sloping top surface, said turntable having its center depressed to provide a wheel receiving trough and having a relatively large bottom surface opposed to said bearing plate portion, cooperating pivot and bearing means on the turntable and bearing plate portions for centering the turntable on the bearing plate portion and a bearing disk interposed between the bearing plate portion and the bottom of said turntable supporting the turntable for rotation, said bearing disk comprising a sheet of a material made by polymerizing gaseous tetrafluoroethylene to a product being substantially inert with a compressive strength of about 1700 pounds per square inch.

4. A compass compensating device of the character described comprising in combination a fixed dial plate and bearing support, a turntable journalled thereon and having a trough for receiving and holding a wheel of an aircraft, a pair of Selsyn motors having electrical connections whereby their rotors rotate in synchronism, one motor having a pointer and an indicating dial thereon, the other motor being mounted on the turntable, said electrical connections comprising an elongated flexible cable of conductors between said motors whereby the motor having said indicating dial thereon may be placed within an aircraft having a wheel on said turntable and means for rotating the rotor of said second motor at the same angular speed as the turntable.

5. A device of the character described comprising a base member provided with a central pivot on its top surface and a circular portion provided with an azimuth scale, a bowl shaped turntable member rotatably mounted on said base member for rotation about said pivot, anti-friction means interposed between the base member and said turntable member, and said turntable member having a tapered rim extending downwardly and outwardly from the bowl portion to close proximity to the base member, the inner wall of said tapered rim being sloped upwardly toward the pivot and said base member having an upwardly sloping surface beneath said inner wall.

6. A compass compensating device of the character described comprising in combination a base having a rim provided with a circular azimuth scale adjacent the periphery thereof, said base having a circular upstanding rib inwardly of said azimuth scale, a turntable overlying the base, said turntable having an outwardly and downwardly sloping rim portion projecting over the annular rib of the base, said turntable having a bowl-shaped portion inwardly of its rim to seat the wheel of an aircraft, a central socket in the base member, a pivot pin extending downwardly from the bottom of the bowl-shaped portion of the turntable into said socket and a bearing plate interposed between the base and the bowl-shaped portion of the turntable.

NEWTON WAKEFIELD.

REFERENCES CITED

The following references are of record in the file of this patent:

UNITED STATES PATENTS

| Number | Name | Date |
|---|---|---|
| 898,115 | Klemp | Sept. 8, 1908 |
| 1,017,033 | Beach | Feb. 13, 1912 |
| 1,365,953 | Reed | Jan. 18, 1921 |
| 1,612,117 | Hewlett et al. | Dec. 23, 1926 |
| 1,881,033 | Smith | Oct. 4, 1932 |
| 2,362,629 | Griffith et al. | Nov. 14, 1944 |
| 2,395,528 | Andersen | Feb. 26, 1946 |

FOREIGN PATENTS

| Number | Country | Date |
|---|---|---|
| 464,940 | France | Jan. 26, 1914 |

OTHER REFERENCES

Publication "Selsyns," Gen. Elect. Co., # GEA 722 B, Sept. 1930.